April 15, 1969  AKIO NAKANO  3,438,833

THERMO-PLASTIC TAPE OR BAND BONDING MACHINE

Filed Dec. 1, 1965  Sheet 1 of 2

United States Patent Office 3,438,833
Patented Apr. 15, 1969

3,438,833
THERMO-PLASTIC TAPE OR BAND BONDING MACHINE
Akio Nakano, Tokyo, Japan, assignor to Nichiro Kogyo Company, Ltd., Sugata-cho, Kanagawa-ku, Yokohama-shi Kanagawa-ken, Japan
Filed Dec. 1, 1965, Ser. No. 510,821
Claims priority, application Japan, Dec. 4, 1964, 39/67,949
Int. Cl. B29c 27/02; B32b 31/12
U.S. Cl. 156—502                    3 Claims

ABSTRACT OF THE DISCLOSURE

This thermo-plastic tape or band bonding machine comprises a base plate, a frame fixed to the base plate, a plunger which has a mounting on the frame for movement toward and away from the base plate and a pressing plate provided on the end of the plunger adjacent to the base plate. A two-stepped cam which has a pivotal mounting on the frame acts during its rotation upon the plunger to cause the pressing plate to move first toward the base plate, then away from the base plate and then again toward the base plate. A heating piece which has a mounting on the frame for movement into and out of a position between the pressing plate and the base plate is provided with mechanism acting in synchronism with the rotation of the cam, to move the heating piece into such position prior to the completion of the first movement of the pressing plate toward the base plate, to move the heating piece out of said position upon the subsequent movement of the pressing plate away from the base plate, and to maintain the heating piece out of such position during the second movement of the pressing plate toward the base plate, so that the first movement of the pressing plate toward the base plate can be used to press the heating piece between two tapes to fuse the opposed surfaces of the tapes, and the second such movement can be used to press the fused surfaces of the tapes together to bond the tapes.

---

This invention relates to a themo-plastic tape or band bonding machine, and more particularly pertains to such a machine adapted for momentarily and automatically bonding the surfaces of a thermo-plastic tape or band wound on an article or a container, thereby fastening the tape or band to the article or the container.

In the thermo-plastic tape or band bonding machine according to this invention, the opposite end surfaces of a tape or band wound on an article or a container are superposed upon each other, a heating piece is inserted therebetween and pressed, thereby melting the surfaces of the tape or band contacting the heating piece, subsequently the heating piece is extracted by releasing the pressing force imparted thereto, the tape or band is again pressed so that the melted surfaces thereof are directly adhered closely to each other, and thus the tape or band is fastened to the article or the container.

Accordingly, it is a primary object of this invention to provide a thermo-plastic tape or band bonding machine, comprising a plunger disposed on a base plate in such a manner that the same is enabled to effect upward and downward movement in a cylinder member or a frame but is always pulled toward the upper portion of said cylinder member or frame by a spring, a pressing plate attached to said plunger, a shaft rotatably provided so as to extend through the upper portion of the cylinder member, a two-stepped cam having upper and lower convex portions formed in one surface thereof being secured to the shaft at its other surface portion, an inclined lever mounted to the shaft in such a manner as to project from the upper surface of said two-stepped cam, said shaft and said two-stepped cam being rotated by pushing the lever so that the top portion of the plunger is pushed downwards by the lower convex portion of said two-stepped cam and thus the plunger is lowered, thereby causing the pressing plate attached to the lower end of the plunger to be disposed into pressing contact with the base plate, a heating piece adapted to be rotated through rotation of said shaft so as to project below the pressing plate, the top portion of the plunger being pulled by the spring so as to be disposed into engagement with the concave portion of the two-stepped cam and raised through further rotation of the two-stepped cam so that the pressing plate is enabled to leave the base plate, the heating piece being adapted to be extracted from below the pressing plate through transmission of the rotation of the shaft to the two-stepped cam, the top portion of the plunger being downwardly pushed by the upper convex portion of the two stepped cam through further rotation of the two-stepped cam so that the pressing plate is again disposed into pressing contact with the base plate, wherein the two surfaces of the tape or band to be bonded to each other are disposed on the base plate holding the heating piece therebetween and pressed between the base plate and the pressing plate, the surfaces contacting the heating piece are melted, subsequently the pressing plate is raised so that the pressing force is released, simultaneously the heating piece is extracted from between the two surfaces of the tape or band, and the pressing plate is again lowered so that the two surfaces of the tape or band are pressed between the base plate and the pressing plate, thereby enabling the two melted surfaces of the tape or band to be directly adhered to each other.

Another object of this invention is to provide a thermoplastic tape or band bonding machine as set forth in the preceding object, wherein the shaft which is secured to the two-stepped cam is rotated by means of a driving means such as, for example, an electric motor.

Another object of this invention is to combine the above-described thermo-plastic tape or band bonding machine with an automatic packing machine adapted to automatically fasten a thermo-plastic tape or band to an article or a container, thereby momentarily and automatically effecting the fastening of the article or the container.

Still another object of this invention is to provide the afore-mentioned thermo-plastic tape or band bonding machine, wherein the incoming and outgoing movements of the heating piece below the pressing plate in response to the two pressing movements of the pressing plate with respect to the base plate are effected by the two-stepped cam which is adapted to be driven through use of electric power, hydraulic pressure, air-pressure or gears.

Further object of this invention is to provide a thermoplastic tape or band bonding machine, wherein the two pressing movements of the pressing plate with respect to the base plate and the corresponding incoming and outgoing movements of the heating plate below the pressing plate are effected by electric, air-pressure or hydraulic means.

Other objects and advantages of this invention will become apparent from the following description taken in conjunction with the accompanying drawings, in which:

FIG. 4 shows a condition where the two portions of a thermo-plastic tape or band to be bonded are placed on the base plate, the two-stepped cam assumes a horizontal position, the pressing plate has left the base plate, and the heating piece has also left the pressing plate;

FIG. 5 shows the first stage of the rotation of the two-stepped cam, where the lower convex portion of the two-stepped cam is lowered and the heating piece is inserted between the two portions of the band and pressed against the base plate;

FIG. 6 shows the second stage of the rotation of the two-stepped cam, where the two-stepped cam is further rotated so that the top portion of the plunger is disposed into engagement with the concave portion of the two-stepped cam, the plunger and the pressing plate are raised, and the heating piece is extracted;

FIG. 7 shows the third stage of the rotation of the two-stepped cam, where the top portion of the plunger is pushed by the upper convex portion of the two-stepped cam so that the plunger is lowered, the heating piece is maintained at the extracted stage, and the two portions of the tape or band are pressed between the lowered pressing plate and the base plate.

Figure 1:
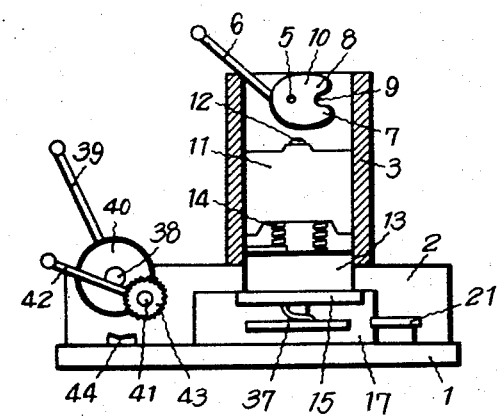
FIG. 1 is a front view, partly taken in section, of the thermo-plastic tape or band bonding machine according to this invention.
Figure 2:
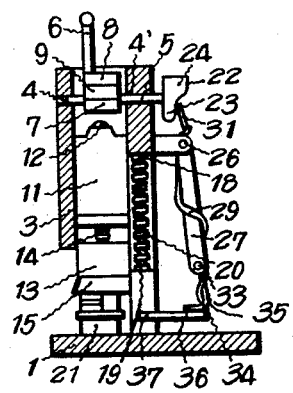
FIG. 2 is a right-hand side view thereof, partly taken in section.
Figure 3:
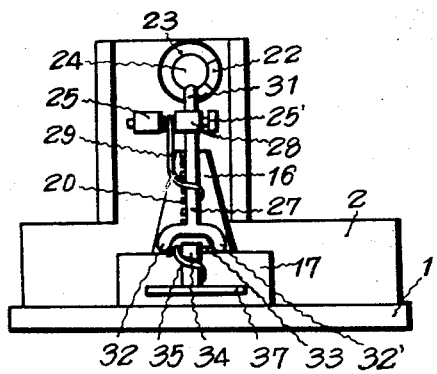
FIG. 3 is a rear view of FIG. 1.

Referring to the drawings, a frame 2 is fixedly disposed on a base plate 1, and a cylinder member 3 is mounted on the frame 2. A shaft 5 is rotatably inserted in through-apertures 4 and 4' formed in the upper portion of the cylinder member 3. To the center of the shaft 5 is secured a two-stepped cam 10 having lower and upper convex portions 7 and 8 provided in its surface so as to form a concave portion 9 therebetween. An inclined lever 6 is secured to the shaft 5 in such a manner as to project from the upper surface of the two-stepped cam 10, and is so arranged that when the free end of the lever 6 is placed to the left, the two convex portions 7 and 8 of the two-stepped cam 10 are caused to project to the right, as viewed in FIG. 1. A plunger 11 is provided below the shaft 5 of the cylinder member 3, and is adapted to be freely moved upwardly and downwardly.

On the upper end of the plunger 11 is rotatably mounted a ball 12 whose diameter is such that it can be fitted within the concave portion 9. Springs 14 are interposed between the plunger 11 and its lower portion 13 separated therefrom. A pressing plate 15 is secured to the lower end of the plunger lower portion 13. A notched portion 16 is provided in the cylinder member 3, in such a manner as to downwardly extend from a point below the rear through-aperture 4' of the cylinder member 3 and is connected with a cavity 17 formed in the center portion of the frame 2, and a projection 18 projects out of the upper end of the notched portion 16. A projection 19 is provided on the lower portion 13 of the plunger 11, and is adapted to be upwardly and downwardly moved within the notched portion 16 through the upward and downward movements of the plunger 11. A spring 20 is interposed between the projections 18 and 19, so that the plunger 11 is always pulled upwardly by the spring 20.

A cutter 21 is projectingly provided on the base plate at a position where it is contacted by the pressing plate secured to the lower end of the lower portion 13 of the plunger 11, when the pressing plate 15 is lowered. A disk-like cam 24 is secured to that portion of the shaft 5 projecting out of the through-aperture 4' of the cylinder member 3, a portion of the outer circumference of the cam 24 being a convex portion 22 and the remaining portion being a flat portion 23. Supporting plates 25 and 25' project from the cylinder member 3 on opposite sides of the through-aperture 4', and a shaft 26 is rotatably inserted in through-apertures formed in the supporting plates 25 and 25'. A rod 27 has an upper rectangular portion 28 secured to the shaft 26.

A spring 29 is wound on the shaft 26, one end of the spring 29 being fixed to the supporting plate 25 and the other end portion thereof extending straight and bent so as to be wound on the center portion of the rod 27, so that the lower end of the rod 27 is always pushed outwardly from the cylinder member 3 by the spring 29. A nail plate 31 is mounted to the inside of the rectangular portion 28 provided on the upper end of the rod 27 so as to project upwardly from the rectangular portion 28, so that when the lower portion of the rod 27 is pushed outwardly of the cylinder member 3, the nail plate 31 is pressed against the outer circumference of the disk-like cam 24.

The lower end portion of the rod 27 is configured in a fork-shape so as to form two legs 32 and 32', which are formed with through-apertures in which is rotatably inserted a rotary shaft 33. A bent plate 34 formed of a vertical plate whose lower portion is bent in a horizontal direction is secured to the shaft 33 at its upper end. A spring 35 is wound on the shaft 33, the one end of the spring 35 being secured to the leg 32 and the other end portion thereof being wound on the vertical portion of the bent plate 34, thereby permitting the horizontal end portion of the bent plate 34 to be lowered against the tension of the spring.

A heating piece 37 is attached to the horizontal portion of the bent plate 34 by means of a screw. A shaft 38 is rotatably mounted to the frame 2 on the left side of the base plate 1, and a disk 40 provided with a lever 39 is fixed to the shaft 38. A shaft 41 is rotatably mounted in an eccentric position on the disk 40. A wheel 43 having its circumference knurled is secured to the shaft 41 so as to be rotatable only to the left by a lever 42 mounted thereto through a one-way clutch. A cradle 44 having a curved surface corresponding to the gear 43 is provided on the base plate 1.

Meanwhile, the two-stepped cam 10 and the shaft 5 may be rotated driving means such as, for example, an electric motor in place of the lever 6.

Now, the operation of the machine according to this invention will be described. In order to fatsen a thermo-plastic tape or band to an article or a container, the machine according to this invention is placed on the article or the container, and one end 45 of the tape or band wound on the article or the container is passed over the base plate 1 from the right-hand side as viewed in FIG. 1, passed below the pressing plate 15 and then held by hand. Thereafter, the other portion 45', of the tape or band is placed on the cradle 44 provided on the base plate 1. Under such condition, a lever 39 is pushed to the right, thereby causing the disk 40 to be rotated so that the tape or band is pressed against the cradle 44 by the knurled wheel 43.

Figure 4:
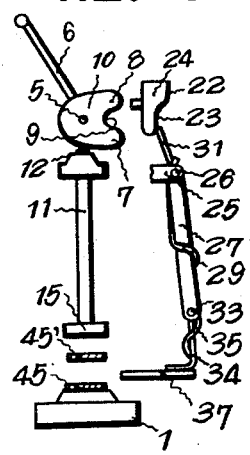
FIGS. 4 through 7 show the rotation of the two-stepped cam, and the relation between the position of the pressing plate with respect to the base plate and that of the heating piece.

Repetition of manipulations in which lever 42 is pushed to the right, returned to the left and again pushed it to the right will cause the knurled wheel to be rotated anti-clockwise by the one-way clutch, so that the tape or band 45' is sufficiently wound on the article or the container and moved to the right so as to be passed below the pressing plate 15 and then placed on the cutter 21. At this stage the parts are in the positions shown in FIG. 4.

Figure 5:
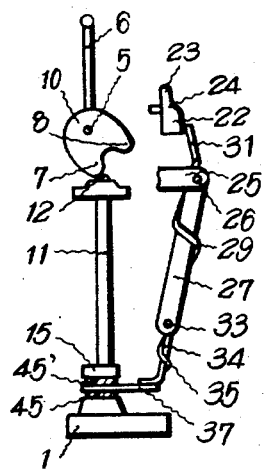
Figure 6:
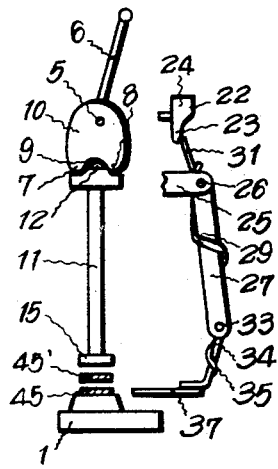

Pushing the lever 6 to the right as shown in FIG. 5 causes rotation of the two-stepped cam 10 and the shaft 5. Thus, the rotary ball 12 provided on the upper end of the plunger 11 which has been raised by means of the spring 20 is pushed by the lower convex portion 7 of the two-stepped cam 10 so as to be lowered, and simultaneously the pressing plate 15 disposed below the plunger lower portion 13 is lowered. When the right end portion of the pressing plate 15 approaches the cutter 21, the tape or band 45' is sheared between the pressing plate 15 and cutter 21, thus being cut off. During the downward movement of the pressing plate 15, the cam 24 is also rotated by the shaft 5 simultaneously with the two-stepped cam 10. By this, though the upper nail plate 31 of the rod 27 has been pressed against the flat portion 23 of the cam 24 by the spring 29, it will be pressed against the convex portion 22 of the cam 24 through rotation of the cam 24 and pushed outwardly by the convex portion 22. On the other hand, the rod 27 provided with the nail plate 31 is rotated about shaft 26 against spring 29, so that the lower portion of the rod 27 is moved inwardly with respect to the frame 2, thereby causing the bent plate 34 attached to the lower end of the rod 27 and the heating piece 37 fixed to the bent plate 34 to project inwardly. Thus, the heating piece 37 is placed between the aforementioned one end 45 of the tape or band adhered closely to the base plate 1 and the other end 45' of the tape or band cut off by the cutter 21. Thereafter, the pressing plate 15 is moved down to the base plate 1, so that the opposite end portions 45 and 45' of the tape or band holding the heating piece therebetween are pressed against the base plate 1 by the pressing plate 15. When the opposing surfaces of the end portions 45 and 45' of the tape or band disposed in contact with the heating piece 37 begin to be melted, the shaft 5 and the two-stepped cam 10 are further rotated to the position shown in FIG. 6, and thus the convex portion 7 of the two-stepped cam 10 is moved apart from the rotary ball 12 provided on the upper end of the plunger 11.

Figure 7:
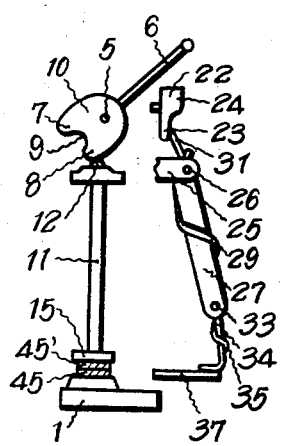

Engagement of the rotary ball 12 with the concave portion 9 of the two-stepped cam 10 causes the plunger 11 to be raised, thereby raising the plunger lower portion 13 and the pressing plate 15. The cam 24 is also rotated through the rotation of the shaft 5, thus shifting the pressing position of the nail plate 31 from the projection 22 to the flat portion 23, so that the nail plate 31 is approached to the cylinder member 3. The rod 27 is rotated back about the shaft 26 by the spring 29, so that the lower portion of the rod 27 is moved outwardly and the heating piece 37 attached to the leg portions 32 and 32' of the rod 27 is also drawn outwardly from below the pressing plate 15. Further rotation of the two-stepped cam 10 to the position shown in FIG. 7 causes the concave portion 8 of the two-stepped cam 10 to be downwardly moved, thereby pushing the rotatary ball 12 provided on the upper end of the plunger 11, so that the plunger 11 moves downwards, and thus the pressing plate 15 presses the opposite end portions 45 and 45' of the tape or band superposed upon each other on the base plate 1. Thus, the surfaces of the opposite end portions 45 and 45' of the tape or band which have been melted by the heating piece 37 are directly adhered closely to each other, thus being bonded under pressure to each other on the base plate 1 by means of the pressing plate 15. At this time, the rod 27 is not rotated since the nail plate 31 mounted to the upper end of the rod 27 continues pressing a wider range of the flat portion 23 irrespective of rotation of the cam 24, and consequently the heating piece 37 which has been removed from below the pressing plate 15 remains at outer position.

Thus, the heating piece 37 is is inserted between the opposite end portions 45 and 45' of the tape or band by moving the lever 6 from the left to the right once, and then the pressing plate 15 is lowered so as to press the opposite end portions 45 and 45' of the tape or band. Next, the pressing plate 15 is raised, and during this upward movement of the pressing plate 15, the heating piece 37 which has melted the contacting surfaces of the opposite end portions of the tape or band is extracted. Thereafter, the pressing plate 15 is again lowered. Thus, the opposite end portions of the tape or band whose surfaces have been melted are bonded mechanically to each other with better accuracy.

In accordance with this invention, therefore, it is possible to simply and quickly fasten a thermo-plastic tape or band to an article or container for the purpose of packaging. Accordingly, this invention can be advantageously applied to mass-packaging of articles. Further, the above-described operation can be effected through use of a driving source instead of the lever. Further, automatic packaging can be achieved by applying this invention to an automatic packing machine adapted to automatically fasten thermo-plastic tapes or bands to articles or containers. Also, it is to be understood that the incoming and outgoing movements of the heating piece 37 below the pressing plate 15 effected with the upward and downward movements of the pressing plate 15 can be carried out not only by the above-described mechanism but also by transmission mechanism using gears, air-pressure, hydraulic pressure or electric power. Furthermore, gears, air-pressure, hydraulic pressure or electric power may be employed for the purpose of causing the pressing plate 15 to be pressed against the base plate 1 and effecting the corresponding incoming and outgoing movements of the heating piece 37 below the pressing plate 15.

Although this invention has been described and illustrated in detail, it is to be understood that the same is by way of explanation and example only and is not to be taken by way of limitation, the spirit and scope of this invention being limited only by the terms of the appended claims.

I claim:

1. A thermo-plastic tape or band bonding machine, comprising a base plate, a frame fixed to the base plate, a cylinder member provided on the upper surface of the frame, a first shaft rotatably inserted in through-apertures formed in the cylinder member, a two-stepped cam having lower and upper convex portions formed in one surface thereof so as to define a concave portion therebetween, said two-stepped cam being secured to the center of the first shaft at the other surface portion thereof, a first lever mounted to the shaft in such a manner as to slantly project from the upper surface of said two-stepped cam, a plunger adapted to be raised and lowered within said cylinder member, a pressing plate secured to the lower end of the plunger, a notched portion formed in the cylinder member below one of said through-apertures, the lower end of the notched portion being connected with a cavity portion formed in the center of said frame, a first projection projecting from the upper end of said notched portion, a second projection projecting from the plunger, a first spring interposed between said first and second projections thereby always pulling the plunger upwardly, a disk-like cam formed with a convex portion defining a part of the circumference thereof and a flat portion defining the other part of the circumference thereof, said disk-like cam being fixed to that portion of the first shaft projecting out of said one through-aperture of the cylinder member, a second shaft projecting from the cylinder member and rotatably supported between first and second supporting plates, a rod secured to said second shaft, a second spring wound on said second supporting plates and the other end thereof being wound on the lower portion of said rod, a nail member attached to the upper end of said rod, said nail member being adapted to be always disposed in pressing contact with said disk-like cam, a bent plate having the vertical plate portion thereof attached to the lower end of said rod, and a heating piece secured to the horizontal plate portion of said bent portion, wherein the two-stepped cam is rotated by manipulation of the first lever so that the top portion of the plunger is pushed by one of the convex portions of the two-stepped cam thereby causing the plunger and the pressing plate secured to the lower end thereof to be lowered, the disk-like cam is rotated through rotation of said first shaft so that the nail member is pressed against the convex portion of the disk-like cam thereby enabling the rod to be rotated about said second shaft, the heating piece secured to the lower end portion of the rod is caused to project below the pressing plate so as to be pressed between the pressing plate and the base plate, the plunger and the pressing plate are raised through engagement of the top portion of the plunger with the concave portion of the two-stepped cam, simultaneously the nail member is pressed against the flat portion of the disk-like cam through rotation of said cam, the rod is reversely rotated about said second shaft by the force imparted by said second spring so that the heating piece secured to the lower end of the rod is extracted from below the pressing plate, the plunger is again lowered by the fact that the top portion of the plunger is pushed by the other convex portion of the two-stepped cam, and consequently the pressing plate is disposed into pressing contact with the base plate.

2. A thermo-plastic tape or band bonding machine as set forth in claim 1, wherein the first shaft is rotated by a driving source instead of the first lever.

3. A thermo-plastic tape or band bonding machine, comprising a base plate, a frame fixed to the base plate, a plunger which has a mounting on the frame for movement toward and away from the base plate, a pressing plate provided on the end of the plunger adjacent to the base plate, a two-stepped cam which has a pivotal mounting on the frame, and which during its rotation acts upon the plunger to cause the pressing plate to move first toward the base plate, then away from the base plate, and then again toward the base plate, a heating piece which has a mounting on the frame for movement into and out of a position between the pressing plate and the base plate, and mechanism acting in synchronism with the rotation of the cam to move the heating piece into such position prior to the completion of the first movement of the pressing plate toward the base plate, to move the heating piece out of such position upon the subsequent movement of the pressing plate away from the base plate, and to maintain the heating piece out of such position during the second movement of the pressing plate toward the base plate, whereby the first movement of the pressing plate toward the base plate can be used to press the heating piece between two tapes to fuse the opposed surfaces of the tapes, and the second such movement can be used to press the fused surfaces of the tapes together to bond the tapes.

References Cited
UNITED STATES PATENTS

| 3,200,028 | 8/1965 | Chisholm | 156—499 |
| 3,269,300 | 8/1966 | Billett et al. | 100—8 |
| 3,368,323 | 2/1968 | Wood | 53—198 |

DOUGLAS J. DRUMMOND, *Primary Examiner.*

U.S. Cl. X.R.

100—33; 53—198